United States Patent
Kubo

(10) Patent No.: US 7,929,922 B2
(45) Date of Patent: Apr. 19, 2011

(54) RADIO COMMUNICATION SYSTEM, A TRANSMITTER AND A RECEIVER

(75) Inventor: Hiroshi Kubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 716 days.

(21) Appl. No.: 11/931,990

(22) Filed: Oct. 31, 2007

(65) Prior Publication Data
US 2008/0064428 A1    Mar. 13, 2008

Related U.S. Application Data

(63) Continuation of application No. 09/685,333, filed on Oct. 6, 2000, now Pat. No. 7,346,316, which is a continuation of application No. PCT/JP99/05646, filed on Oct. 13, 1999.

(30) Foreign Application Priority Data

Feb. 16, 1999   (JP) .................................... 11-036655

(51) Int. Cl.
    *H03C 7/02*    (2006.01)
(52) U.S. Cl. ..................... 455/101; 455/550.1
(58) Field of Classification Search .............. 455/101, 455/102, 103, 73, 91, 560, 562.1, 115.2, 455/403, 115.1, 105, 110, 550.1, 114.3, 115.3, 455/127.2, 69, 522
    See application file for complete search history.

(56) References Cited

U.S. PATENT DOCUMENTS

| 4,490,830 A | | 12/1984 | Kai et al. |
| 4,896,371 A | * | 1/1990 | Kahn .......................... 455/105 |
| 5,060,302 A | * | 10/1991 | Grimes ....................... 398/197 |
| 5,081,651 A | | 1/1992 | Kubo |
| 5,146,475 A | | 9/1992 | Kubo |
| 5,164,964 A | | 11/1992 | Kubo |

(Continued)

FOREIGN PATENT DOCUMENTS

EP    0040731    12/1981

(Continued)

OTHER PUBLICATIONS

Winters, "The Diversity Gain of Transmit Diversity in Wireless Systems with Rayleigh Fading," IEEE Transactions on Vehicular Technology, vol. 47, No. 1, Feb. 1998, pp. 119-123.

*Primary Examiner* — Tu X Nguyen
(74) *Attorney, Agent, or Firm* — Rothwell, Figg, Ernst & Manbeck pc

(57) ABSTRACT

In a transmitter 2A, after an output level of a modulated signal is regulated by a first gain regulator 5A, the signal is transmitted from a first antenna 8A without delay, and after the modulated signal is delayed by a delay unit 6A and an output level of the delay output is regulated by a second gain regulator 7A, this signal is transmitted from a second antenna 9A. Similarly, in a transmitter 2B, after an output level of a modulated signal is regulated by a first gain regulator 5B, the signal is transmitted from a first antenna 8B without delay, and after the modulated signal is delayed by a delay unit 6B and an output level of the delay output is regulated by a second gain regulator 7B, this signal is transmitted from a second antenna 9B. A receiver 3 receives the transmitted signals from the four antennas 8A, 8B, 9A and 9B via an antenna 10, and executes a demodulation process.

5 Claims, 13 Drawing Sheets

U.S. PATENT DOCUMENTS

| | | | |
|---|---|---|---|
| 5,423,059 A | 6/1995 | LoGalbo et al. | |
| 5,542,107 A | 7/1996 | Kay | |
| 5,584,057 A * | 12/1996 | Dent | 455/101 |
| 5,812,935 A | 9/1998 | Kay | |
| 5,859,870 A | 1/1999 | Tsujimoto | |
| 5,867,109 A | 2/1999 | Wiedeman | |
| 5,884,149 A * | 3/1999 | Jaakola | 455/103 |
| 6,034,987 A | 3/2000 | Chennakeshu et al. | |
| 6,141,542 A * | 10/2000 | Kotzin et al. | 455/101 |
| 6,259,730 B1 | 7/2001 | Solondz | |
| 6,587,515 B1 | 7/2003 | Jafarkhani et al. | |

FOREIGN PATENT DOCUMENTS

| | | | |
|---|---|---|---|
| EP | 0755127 | A2 | 1/1997 |
| EP | 0767546 | A2 | 9/1997 |
| GB | 2259430 | A | 10/1993 |
| JP | 63286027 | | 11/1988 |
| JP | 4-1444428 | | 5/1992 |
| JP | 04-357344 | | 7/1994 |
| JP | 8-505503 | | 6/1996 |
| JP | 09197059 | | 7/1997 |
| JP | 10190633 | | 7/1998 |
| JP | 11-122150 | | 4/1999 |
| WO | 9107020 | A1 | 5/1991 |
| WO | 9200639 | A1 | 1/1992 |
| WO | 9506365 | A1 | 3/1995 |
| WO | 9608088 | A1 | 3/1996 |
| WO | 9827663 | A2 | 6/1998 |
| WO | 9851110 | A1 | 11/1998 |

* cited by examiner

FIG.3
THE SIGNAL RECEIVED
IN THE RECEIVER 3
FROM THE TRANSMITTER 2A
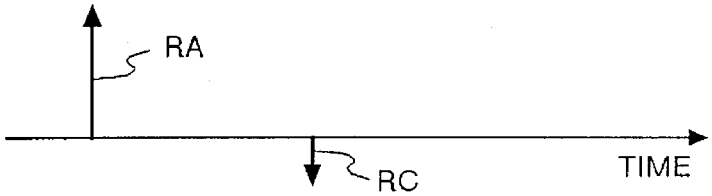
THE SIGNAL RECEIVED
IN THE RECEIVER 3
FROM THE TRANSMITTER 2B
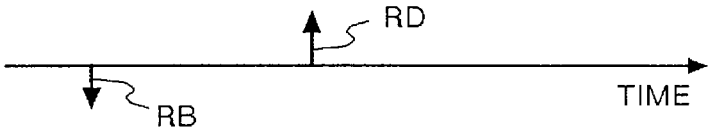
SIGNAL OBTAINED BY
SYNTHESIS IN THE
RECEIVER 3
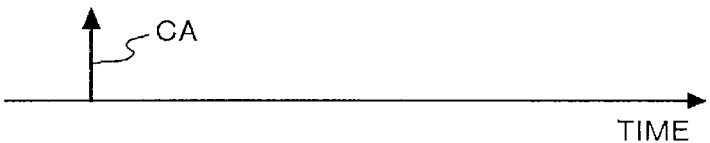

PRIOR ART

RADIO COMMUNICATION SYSTEM, A TRANSMITTER AND A RECEIVER

CROSS-REFERENCE TO RELATED APPLICATIONS

This application is a continuation of application Ser. No. 09/685,333, filed on Oct. 6, 2000, now U.S. Pat. No. 7,346, 316, issued Mar. 18, 2008 which is a continuation of application Ser. No. PCT/JP99/05646, filed on Oct. 13, 1999, which claims priority from JP 11 -036655, filed Feb. 16, 1999, the contents of which are incorporated herein by reference in their entirety.

TECHNICAL FIELD

The present invention relates to a radio communication system including a mobile phone and a portable telephone. More specifically, this invention relates to a radio communication system, transmitter and receiver which are capable of covering a wide area with a simple structure under the environment such that a plurality of transmitters transmit same signals with same frequencies.

BACKGROUND ART

A mobile phone system generally comprises a base station which is connected with a communication network and a mobile station such as portable telephone or the like. In this system, a communicable distance between the base station and the mobile station is closely related to the transmittable power. Therefore, in order to cover a wide area, a method of transmitting same signals with same frequencies from a plurality of base stations is considered.

There will be concretely explained below a conventional radio communication system with reference to drawings. For example, FIG. 11 is a diagram showing a structure of the conventional radio communication system having a structure for covering a wide area. In FIG. 11, legends 107A and 107B represent base stations, legend 101 represents a transmission information input terminal into which transmission information is input from a network. Legends 102A and 102B represent modulators, legends 103A and 103B represent antennas of the base stations, legends 104 represents a mobile station, and legend 105 represents an antenna of the mobile station. Here, an internal structure of the base stations 107A and 107B will be described concentrating at the modulators 102A and 102B which have the most important function. The base station 107A transmits information via the antenna 103A. Similarly the base station 107B transmits information via the antenna 103B. The mobile station 104 receives transmitted signals from the two base stations 107A and 107B via the antenna 105.

In the radio communication system having the above structure, normally the radio wave environment is determined by a positional relationship between the mobile station 104 and the base stations 107A and 107B. FIG. 12 is a timing chart showing radio wave propagation in the conventional radio communication system. For example, the mobile station 104 receives the transmitted signals from the two base stations 107A and 107B simultaneously so that wide range coverage can be realized. However, as shown in FIG. 12, in a specified area (in the case where distances between the mobile station 104 and the two base stations are approximately equal), the power of the signal RA received from the base station 107A is equal to the power of the signal RB received from the base station 107B, but their polarities become occasionally opposite to each other. In this case, the two received signals RA and RB offsets each other, and when they are synthesized, no signal exists.

Another example of the conventional radio communication system is a radio communication system disclosed in Patent Gazette No. 2572765. For example, in this radio communication system, a base station is provided with a plurality of antennas, and a method of delaying transmission signals by not less than 1 symbol by means of a delay unit is used. As a result, the radio communication system which covers a wider area can be realized. FIG. 13 is a diagram showing a structure of such a radio communication system where a plurality of antennas are provided to the base station and which point is different from FIG. 11. In FIG. 13, legend 107 represents a base station, legend 101 represents a transmission information input terminal where transmission information is input from a network, and legend 102 represents a modulator. Further, legend 103A represents a first antenna of the base station 107, legend 106 represents a delay unit, legend 103C represents a second antenna of the base station 107, legend 104 represents a mobile station and legend 105 represents an antenna of the mobile station 104.

In the radio communication system having the above structure, the base station 107 transmits information via the first antenna 103A, and the delay unit 106 delays the same information by not less than 1 symbol. Thereafter, the base station 107 transmits the information via the second antenna 103C. The mobile station 104 receives signals transmitted from the two antennas 103A and 103C of the base station 107 via the antenna 105. At this time, since the signals from the two antennas on the transmission side have time difference of not less than 1 symbol, the time difference is corrected by an equalizer in the mobile station 104.

Further, in the radio communication system shown in FIG. 13, if the radio wave environments in the transmission antennas 103A and 103C are independent of each other, the phenomenon such that the received signals offset each other and no signal exists can be eliminated by a diversity effect. As a result, the characteristic can be improved. However, in this structure, the base station is only one, and the transmission signals are delayed by not less than 1 symbol. For this reason, a circuit size of the equalizer in the mobile station is disadvantageously increased, and thus this structure is insufficient to solve the problem.

That is, as shown in FIG. 11, when the radio communication system which covers a wide area is realized, there arises a problem that the signals from a plurality of base stations offset each other and reception of the signals is difficult in a specified position. On the other hand, as shown in FIG. 13, when the base station outputs a normal transmission signal and a transmission signal delayed from the normal transmission signal, there arises a problem that the structure of the equalizer on the receiving side becomes complicated.

The present invention is devised in order to solve the above problems. It is an object of the invention to provide a radio communication system, transmitter and receiver which previously prevent the phenomenon that all signals decay after synthesization in mobile stations between a plurality of base stations and are capable of covering a wide area with a simple structure.

DISCLOSURE OF THE INVENTION

A radio communication system according to one aspect is constituted so that a plurality of transmitters transmit same signals with same frequencies and a receiver receives these signals, and is further characterized in that at least one antenna is provided to each of said transmitters, and arbitrary delay is given (including a case where no delay is given) to the signals to be transmitted from said antennas so that output power which is different from at least one delay output in the other transmitters is set in each of said transmitters.

According to the above invention, an arbitrary delay can be given to respective antennas, and at least one delay output in the transmitters is set so that the output powers are different from each other. As a result, all the signals do not decay after synthesization. Moreover, the transmitters set radio wave environments of the antennas independently so that the characteristic is improved by a diversity effect. Further, the delay can be set so as not to be not less than 1 symbol so that a circuit size of the equalizer (not shown) in the receiver is reduced further than the conventional art.

A radio communication system according to another aspect is characterized in that in the case where different delays (including the case of no delay) as the arbitrary delays are given respectively to the plurality of antennas in the transmitters, a combination of output powers which is different from corresponding delay outputs in the other transmitters is set in the respective transmitters.

According to the above invention, combinations of the transmission powers in the delay outputs from a plurality of antennas of the transmitters are different between the adjacent transmitters. As a result, a conventionally occurring phenomenon that a filtered signal decays in a specified area is previously prevented. Moreover, the radio wave environments of the antennas are set independently so that the characteristic is improved by the diversity effect. Further, the delay can be set so as not to be not less than 1 symbol so that the circuit size of the equalizer in the receiver is reduced.

A radio communication system according to another aspect is characterized in that an equalizer in the receiver demodulates a signal transmitted from at least one antenna in each of the transmitters.

According to the above invention, the receiver demodulates the delay outputs with different transmission powers in the adjacent base stations from a plurality of the antennas using the equalizer.

A radio communication system according to another aspect is constituted so that a plurality of transmitters transmit same signals with same frequencies and a receiver receives these signals, and is characterized in that at least one antenna is provided to each of the transmitters, and signals which are supplied to respective antennas are signals which are obtained by differently delaying modulated signals and carrying out weighting synthesization (including complex number) on them, and at least one of delay amount and weighting factor in each of the transmitters is set to a value different from the other transmitters.

According to the above invention, at least one of the delay amount and weighting factor in the transmitters is set to a different value between the adjacent transmitters so that the conventionally occurring phenomenon that the filtered signal decays in a specified area is previously prevented. Moreover, even if the transmitters have only one antenna, the same effect as that of the structure having a plurality of antennas can be produced. Further, the delay can be set so as not to be not less than 1 symbol so that the circuit size of the equalizer in the receiver is reduced.

A radio communication system according to another aspect is characterized in that an equalizer in the receiver demodulates a signal transmitted from at least one antenna in each of the transmitters.

According to the above invention, the receiver demodulates the filtered signals from a plurality of antennas using the equalizer.

A radio communication system according to another aspect is constituted so as to have a plurality of antennas each transmitting same signal and a receiver that receives these signals, and is characterized in that signals which are supplied to the plurality of antennas are signals which are obtained by differently delaying modulated signals and by carrying out weighting synthesization on them, and at least one of delay amount and weighting factor is set to different values in each of the antennas.

According to the above invention, at least one of the delay amount and weighting factor in the signal filtering sections corresponding to the plural antennas in one transmitter is set to a different value between the adjacent antennas so that the conventionally occurring phenomenon that the filtered signals decays in a specified area is previously prevented. Moreover, even if the transmitters have only one antenna, the same effect as that of the structure having a plurality of antennas can be produced. Further, the delay can be set so as not to be not less than 1 symbol so that the circuit size of the equalizer in the receiver is reduced.

A radio communication system according to another aspect is characterized in that an equalizer in the receiver demodulates signals transmitted from the plurality of antennas.

According to the above invention, the receiver demodulates the filtered signals from the plural antennas using the equalizer.

A transmitter according to another aspect is characterized in that in the case where a plurality of transmitters transmit same signals with same frequencies, at least one antenna is provided, and an arbitrary delay (including a case of no delay) is given to the antenna so that an output power which is different from at least one delay output in the other transmitters is set.

According to the above invention, arbitrary delay can be applied to the antennas, and at least one delay output in the transmitters is set so that the output powers are different from each other. As a result, all the signals do not decay after synthesization. Moreover, the transmitters set the radio wave environments of the antennas independently.

A transmitter according to another aspect is characterized in that in the case where different delays (including the case of no delay) as arbitrary delays are given to a plurality of antennas, a combination of output powers which is different from corresponding delay outputs in the other transmitters is set.

According to the above invention, combinations of transmission powers in the delay outputs from the plural antennas of respective transmitters are different between the adjacent transmitters so that the conventionally occurring phenomenon that the filtered signals decay in a specified area is previously prevented. Moreover, the radio wave environments of the antennas are set independently.

A transmitter according to another aspect is characterized in that in the case where a plurality of transmitters transmit same signals with same frequencies, at least one antenna is provided, and signals which are supplied to respective antennas are signals which are obtained by differently delaying modulated signals and by carrying out weighting synthesization (including complex number) on them, and at least one of delay amount and weighting factor is set to a value different from the other transmitters.

According to the above invention, at least one of the delay amount and weighting factor in the transmitters is set to different values between the adjacent transmitters so that the conventional occurring phenomenon that the filtered signals erupt in a specified information is previously prevented.

A transmitter according to another aspect is characterized in that in the case where same signals are transmitted from a plurality of antennas, signals which are supplied to respective antennas are signals which are obtained by differently delaying modulated signals and by carrying out weighting synthesization on them, and at least one of delay amount and weighting factor is set to different values in the antennas.

According to the above invention, at least one of the delay amount and weighting factor in respective signal filtering sections corresponding to the plural antennas of one transmitter is set to a different value between the adjacent antennas so that the conventionally occurring phenomenon that the filtered signals erupt in a specified area is previously prevented.

A receiver according to another aspect is characterized such that it demodulates same signals which are transmitted from a plurality of antennas in a plurality of transmitters.

According to the above invention, the receiver demodulates the signals output (delay signals or filtered signals) from a plurality of antennas using the equalizer.

BRIEF DESCRIPTION OF THE DRAWINGS

FIG. 3 is a timing chart showing radio wave propagation in the radio communication system which is operated by a condition different from one shown in FIG. 2;

BEST MODE FOR CARRYING OUT THE INVENTION

In order to further detail the present invention, there will be explained below embodiments of the present invention with reference to the attached drawings.

Figure 1:
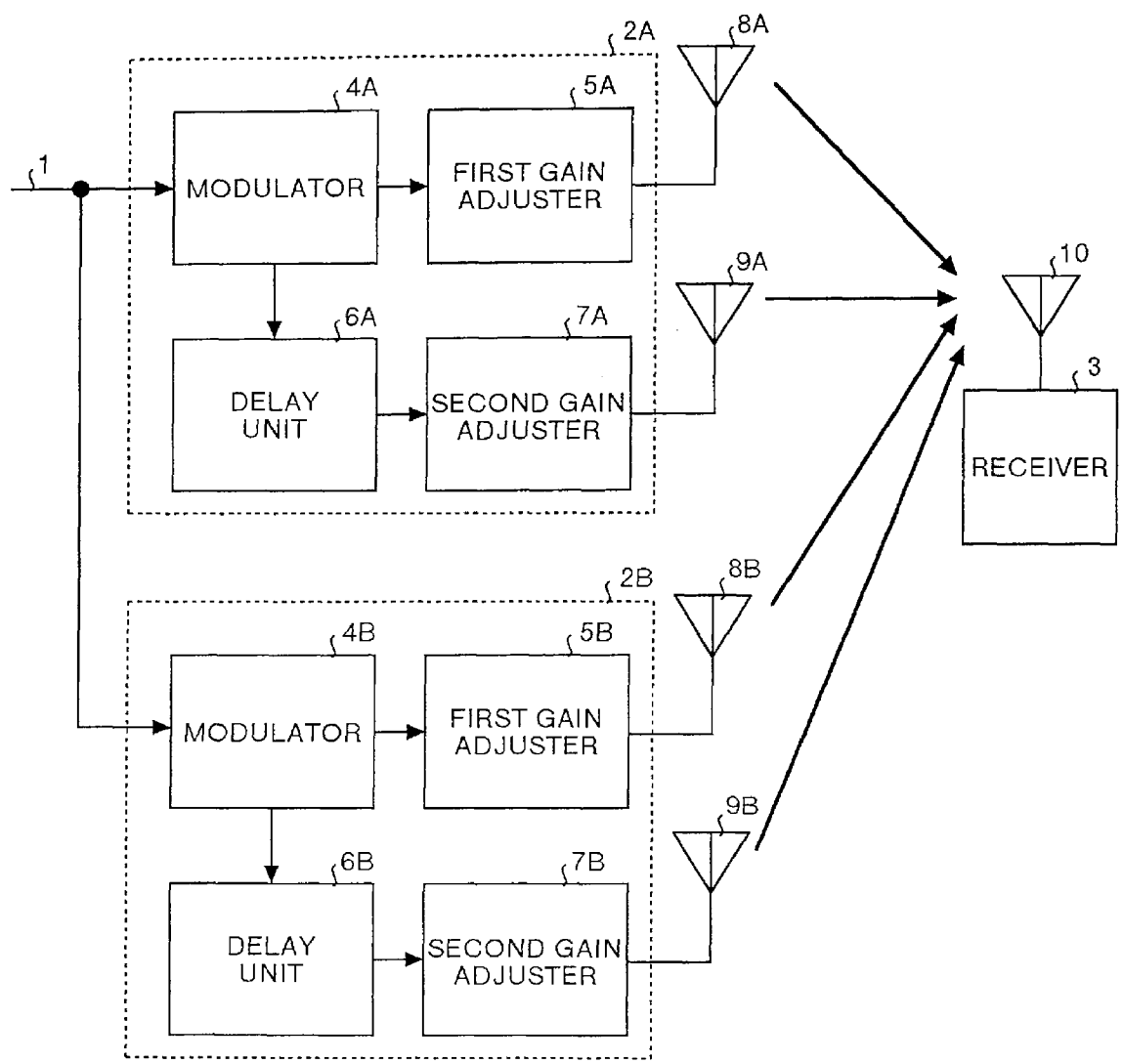
FIG. 1 is a diagram showing a structure of a radio communication system according to a first embodiment of the present invention.

First of all, the structure of the radio communication system of the present invention will be explained. FIG. 1 shows the structure of the radio communication system according to a first embodiment of the present invention. In FIG. 1, legend 1 represents a transmission information input terminal, legends 2A and 2B represents transmitters, legend 3 represents a receiver, and legends 4A and 4B represent modulators. Further, legends 5A and 5B represent first gain adjuster, legends 6A and 6B represent delay units, and legends 7A and 7B represent second gain adjuster. Further, legends 8A and 8B represent first antennas, legends 9A and 9B represent second antennas, and legend 10 an antenna of the receiver 3.

The radio communication system having the above structure is constituted so that at least one antenna (two antennas have been shown in the figure for convenience of explanation) is provided in each of the transmitters 2A and 2B (only two transmitters have been shown in the figure for convenience of explanation). For example, signals to be transmitted from the antennas 9A and 9B are delayed arbitrarily (including a case where no delay is given) by each of the delay units 6A and 6B. At this time, the delay outputs from the transmitters are set so that their output powers are different from each other. The transmitters transmit the signals with the set output powers from respective antennas.

In the present embodiment, two transmitters have been shown for the convenience of explanation, but the present invention is not limited to this. That is, three or more transmitters may be provided. Similarly, two antennas have been shown in each of the transmitters, but the present invention is not limited to this. That is, any number of antennas may be used.

The structure shown in the base station of FIG. 1 is the one that are required to fulfill all the important functions. For example, this function includes a case where an up-converting process for converting a base band signal into RF frequency has been performed at the time of outputting from the modulators 4A and 4B, a case where the process is performed after the delay process, or a case where the process is performed after gain regulation and all these cases. Further, respective antennas include a leakage coaxial cable or the like, for example, which has the same function as a normal antenna. Moreover, as for the modulators 4A and 4B and the delay units 6A and 6B, their structures can be simplified by using one of them commonly to the two functions.

In the present embodiment, arbitrary delay is given to the respective antennas, and at least one delay output between the transmitters is set so as to have a different output power. For this reason, all the signals do not decay after synthesization. Moreover, the respective transmitters set their radio wave environments independently so that the characteristic can be improved by the diversity effect. Further, the delay cannot be optionally set to not less than 1 symbol, and a circuit size of an equalizer (not shown) can be reduced greatly as compared to the conventional one.

Operation of the radio communication system having the above structure will be explained here. For example, in the transmitter 2A, after an output level of the signal to be transmitted is regulated by the first gain regulator 5A, the signal is transmitted from the first antenna 8A without delay. On the other hand, the signal is delayed by the delay unit 6A. The output level of this signal is further regulated by the second gain regulator 7A so as to be transmitted from the second antenna 9A. Similarly, in the transmitter 2B, after an output level of the signal to be transmitted is regulated by the first gain regulator 5B, the signal is transmitted from the first antenna 8B without delay. On the other hand, the signal is delayed by the delay unit 6B. The output level of this signal is regulated by the second gain regulator 7B so as to be transmitted from the second antenna 9B. The receiver 3 receives the signals transmitted from the four antennas 8A, 8B, 9A and 9B via the antenna 10 and executes the demodulation process.

Figure 2:
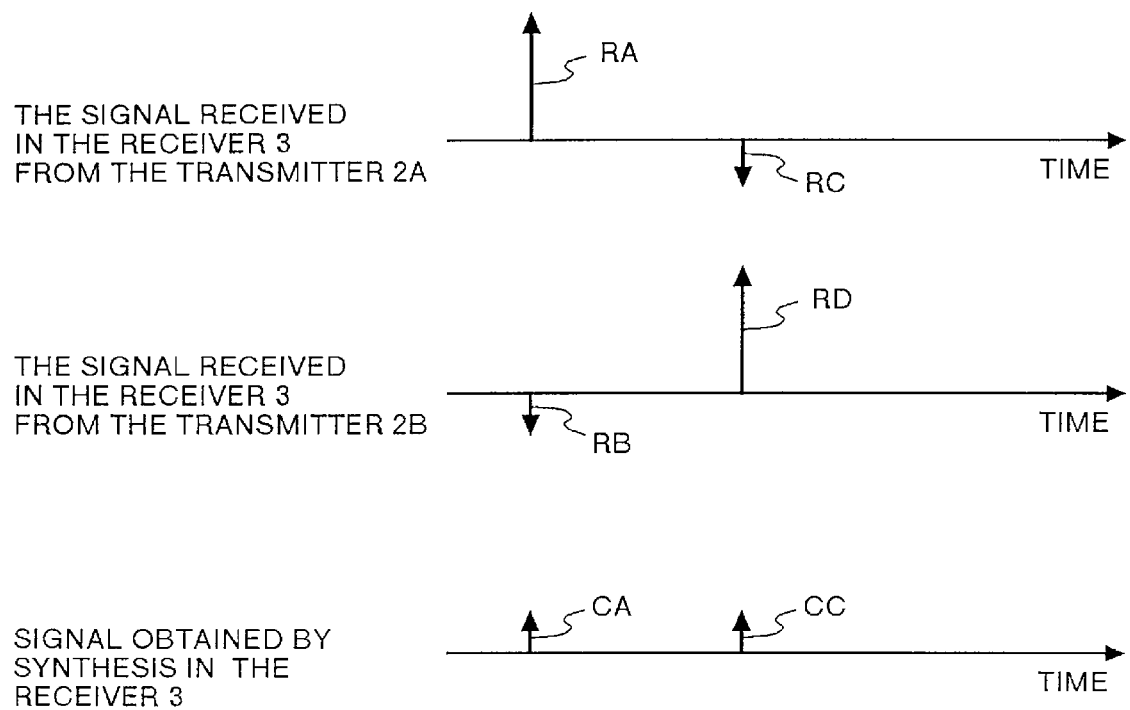
FIG. 2 is a timing chart showing radio wave propagation in the radio communication system according to the first embodiment.

FIG. 2 is a timing chart showing radio wave propagation of the radio communication system according to the present embodiment. In the present embodiment, the delay values of the delay units 6A and 6B are equal, further, the gains of the first gain regulator 5A (transmitter 2A) and the second gain regulator 7B (transmitter 2B) are equal, and the gains of the second gain regulator 7A (transmitter 2A) and the first gain regulator 5B (transmitter 2B) are equal. However, the gains of the first gain adjuster and the second gain adjuster in the respective transmitters are not same. Namely, as for the delay outputs between the adjacent transmitters (the combinations of the first antennas 8A and 8B and the second antennas 9A and 9B), the gains are set so that transmission powers are different from each other. Such setting in the present embodiment is just an example of the operation in the radio communication system of the present invention. For example, as mentioned above, at least one delay output between the transmitters may be set so that its output power is different from the other.

Normally, the distance between the first antenna 8A and the second antenna 9A in the transmitters 2A is negligibly small as compared to the distance between two transmitters. Similarly, the distance between the first antenna 8B and the second antenna 9B in the transmitter 2B is negligibly small as compared to the distance between the transmitters. Therefore, in this structure, a condition that a signal receiving environment becomes the most strict is the case where the receiver 3 is positioned at almost half way between two transmitters. Further, in the receiver 3, the received signal level becomes the lowest when the delay values of the delay units 6A and 6B are the same as shown in FIG. 2, and when a signal component RA from the first antenna 8A in the transmitter 2A and a signal component RB from the first antenna 8B in the transmitter 2B have opposite phases, and a signal component RC from the second antenna 9A in the transmitter 2A and a signal component RD from the second antenna 9B in the transmitter 2B have opposite phases.

In the radio communication system of the present embodiment, gains of the first gain regulator 5A and the first gain regulator 5B are different from the gains of the second gain regulator 7A and the second gain regulator 7B. For this reason, in the above explained cases, even if the received signals with the same delay amount are input with opposite phases, the received signals never offset each other completely and therefore remain. Precisely, in FIG. 2, two signals of a signal component CA and a signal component CC as filtered signals whose delay amounts are different remain.

Meanwhile, if the signal component RC from the second antenna 9A in the transmitter 2A and the signal component RD from the second antenna 9B in the transmitter 2B have different phases and the signal levels are equal, the radio communication system according to the present embodiment operates as follows. This condition can be satisfied under the environment that the receiver 3 exists near the transmitter 2A. FIG. 3 is a timing chart showing radio wave propagation in the radio communication system in the above case.

In this case, as for the signal component RA from the first antenna 8A and the signal component RB from the first antenna 8B, the level of the signal component RA becomes always high. For this reason, in the receiver 3, for example, the signal component RC from the second antenna 9A offsets the signal component RD from the second antenna 9B, but the signal component RA does not offset the signal component RB. For this reason, the signal components always remain.

In the present embodiment, the combinations of the transmission powers in the delay outputs (including no delay) from a plurality of antennas of the respective transmitters are different from each other between the adjacent transmitters. As a result, since the signal components do not offset each other, the conventionally-occurring phenomenon that the signal after the synthesization decays in a specified area can be previously prevented. Moreover, the radio wave environment of the antennas is set independently so that the characteristic can be improved by the diversity effect. Further, since the delay can be set so as not to be more than 1 symbol, the circuit size of the equalizer in the receiver can be reduced greatly as compared to the conventional one.

Figure 4:
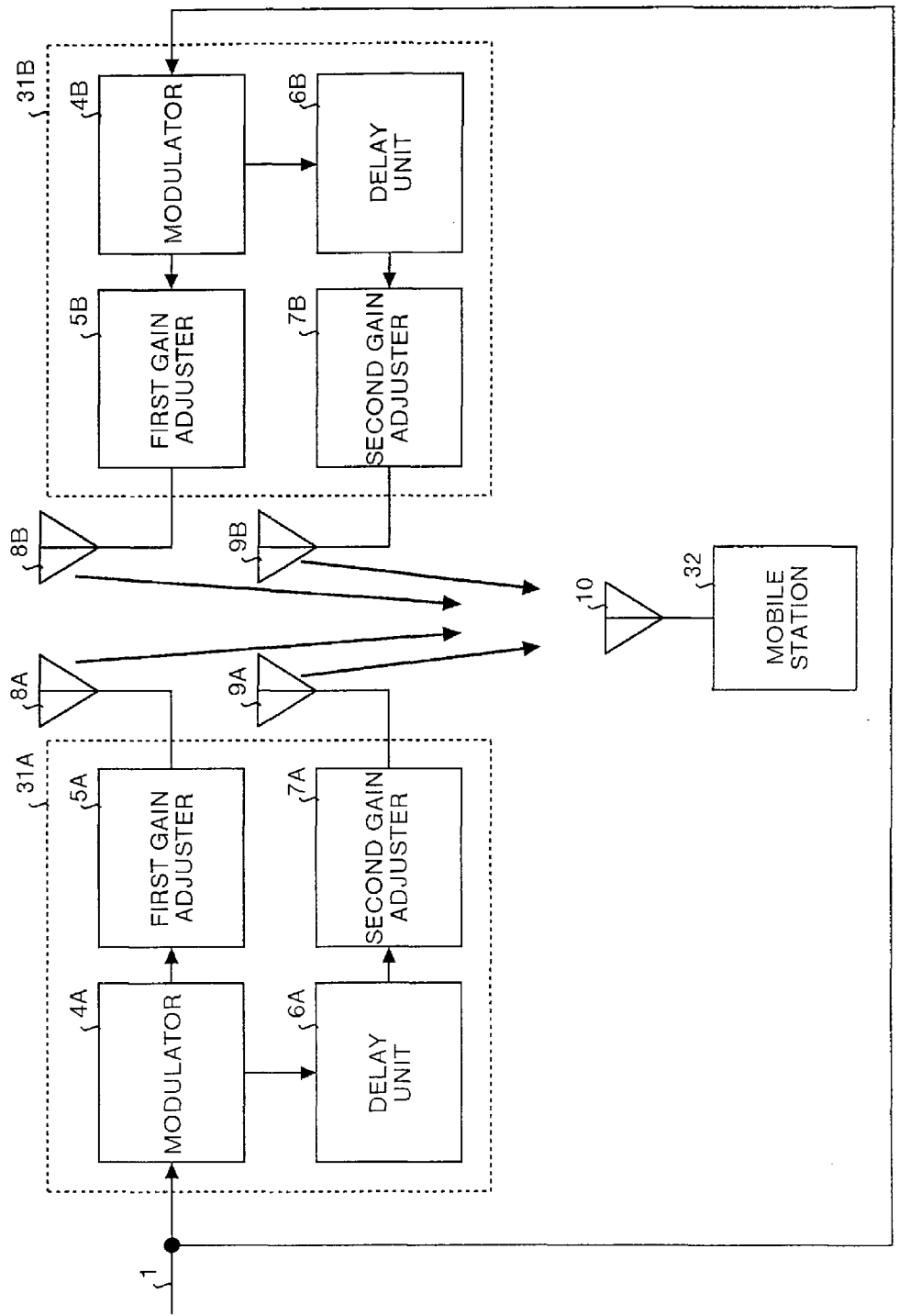
FIG. 4 is a diagram showing a concrete example in the case where the radio communication system of the present invention is applied to communication between a base station and a mobile station.

FIG. 4 is a diagram showing a concrete example in the case where the transmitters in the communication system shown in FIG. 1 are replaced by base stations (corresponding to base stations 31A and 32B in the diagram), and the receiver is replaced by a mobile station (corresponding to mobile station 32), and the radio communication system of the present invention is applied to the communication between the base stations and the mobile station. Two base stations have been shown in FIG. 4 for convenience of the explanation, but the present invention is not limited to this. That is, three or more base stations may be used. Moreover, two antennas are shown in each of the base stations, but the present invention is not limited to this. That is, any number of antennas may be used.

Figure 5:
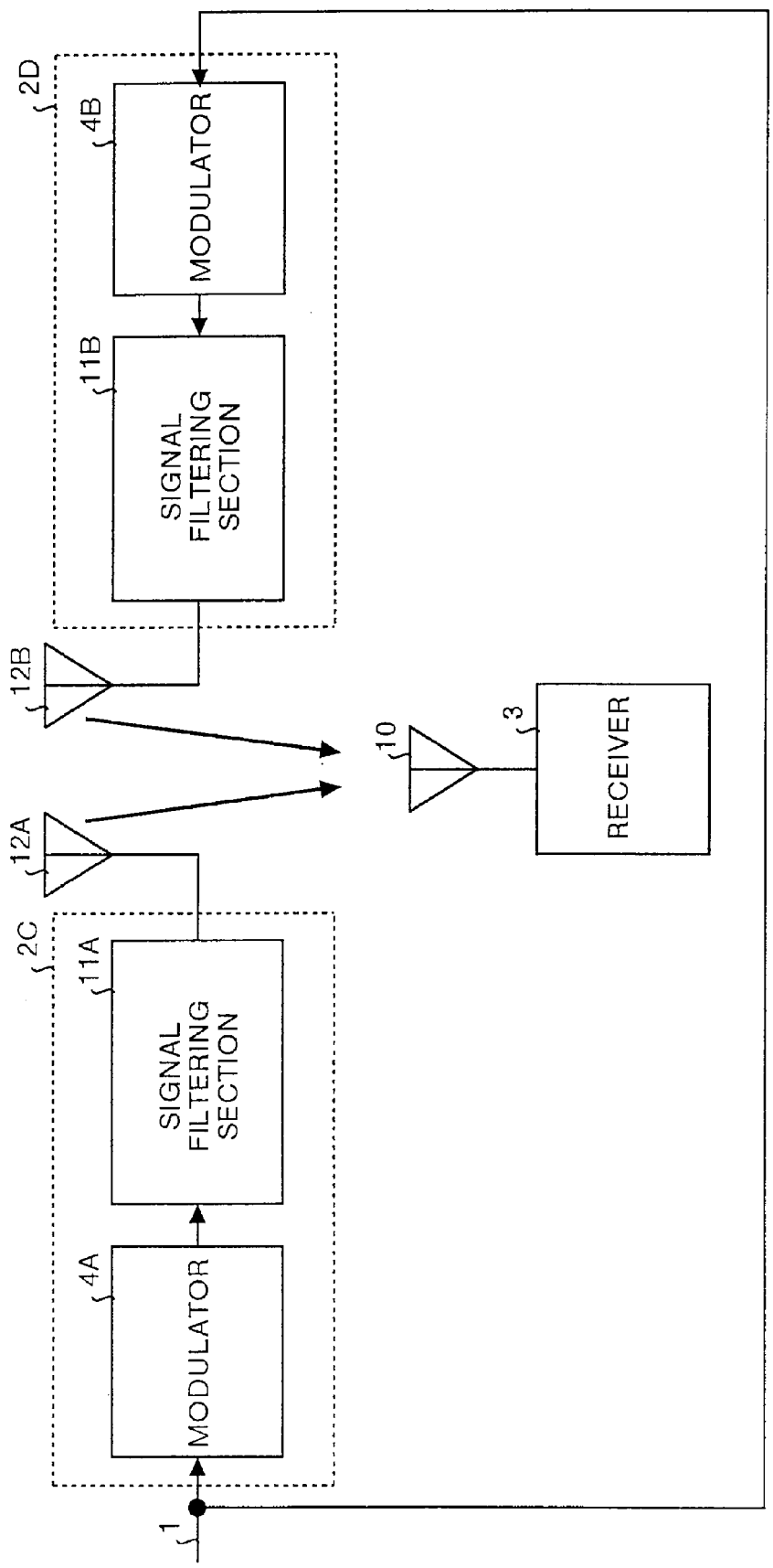
FIG. 5 is a diagram showing a structure of the radio communication system according to a second embodiment of the present invention.

FIG. 5 shows a structure of the radio communication system according to a second embodiment of the present invention. The same legends are provided to the parts of the structure which are the same as those of the first embodiment, and the explanation thereof is omitted. In FIG. 5, 2C and 2D are transmitters, and 11A and 11B are signal filtering sections.

Figure 6:
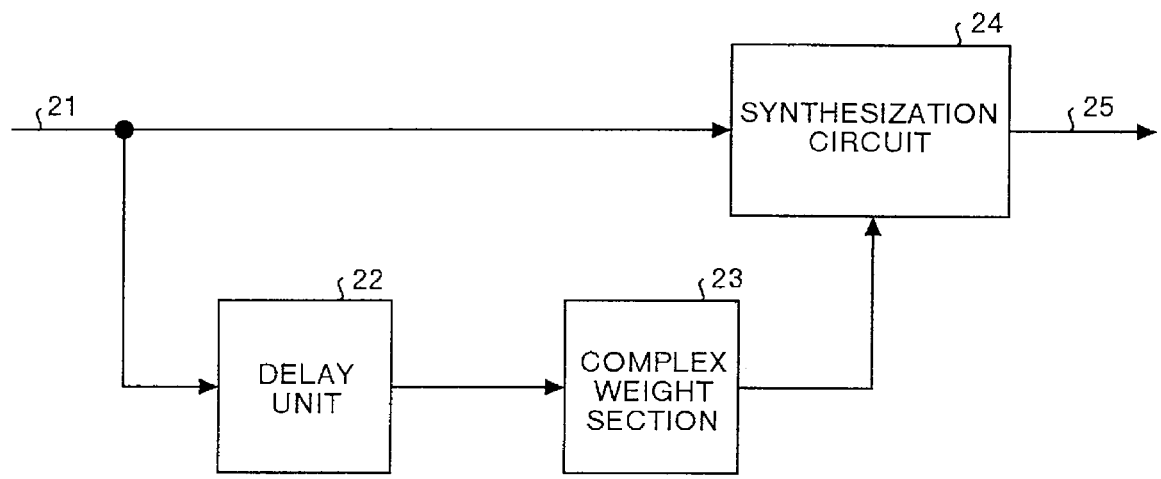
FIG. 6 is a diagram showing a structure of signal filtering sections 11A and 11B.

Further, FIG. 6 is a diagram showing a structure of the signal filtering sections 11A and 11B. In FIG. 6, legend 21 represents a modulated signal input terminal, legend 22 represents a delay unit, legend 23 represents a complex weight section, legend 24 represents a synthesization circuit, and legend 25 represents a filtered signal output terminal.

The radio communication system having the above structure is constituted so that at least one antenna (only one antenna is shown for convenience of explanation) is provided in a plurality of transmitters (only two transmitters are shown for convenience of explanation) 2C and 2D. Modulated signals which are output from the antennas 12A and 12B, for example, are delayed arbitrarily by the delay units 22 (including the case where the signals are not delayed). Weight synthesization is executed in the synthesization circuit 24 by using the original modulated signals and the arbitrarily delayed modulated signals so that filtered signals are generated. Thereafter, the transmitters output transmission signals from the antennas with set output power.

In the present embodiment, two transmitters are shown for convenience of explanation, but the present invention is not limited to this. That is, three or more transmitters may be used. Moreover, one antenna is shown in each of the transmitters, but the present invention is not limited to this. That is, any number of antennas may be used.

The structure shown in FIG. 5 is only the one that is required to fulfill all the important functions. For example, this function includes a case where an up-converting process for converting a base band signal into RF frequency has been performed at the time of outputting from the modulators 4A and 4B, a case where the process is performed after the delay process, or a case where the process is performed after gain regulation and all these cases. Further, the antennas include a leakage coaxial cable or the like which has the same function as a normal antenna.

Operation of the radio communication system having the above structure will be explained here. For example, in the transmitter 2C, after the signal filtering section 11A executes the weight synthesization on the signal modulated by the modulator 4A so as to generate the filtered signal, the filtered signal is transmitted from the antenna 12A. Similarly, in the transmitter 2D, after the signal filtering section 11B executes the weight synthesization on the signal modulated by the modulator 4B so as to generate the filtered signal, the filtered signal is transmitted from the antenna 12B. The receiver 3 receives the signals transmitted from the two antennas 12A and 12B via the antenna 10, and executes the demodulation process.

Figure 7:
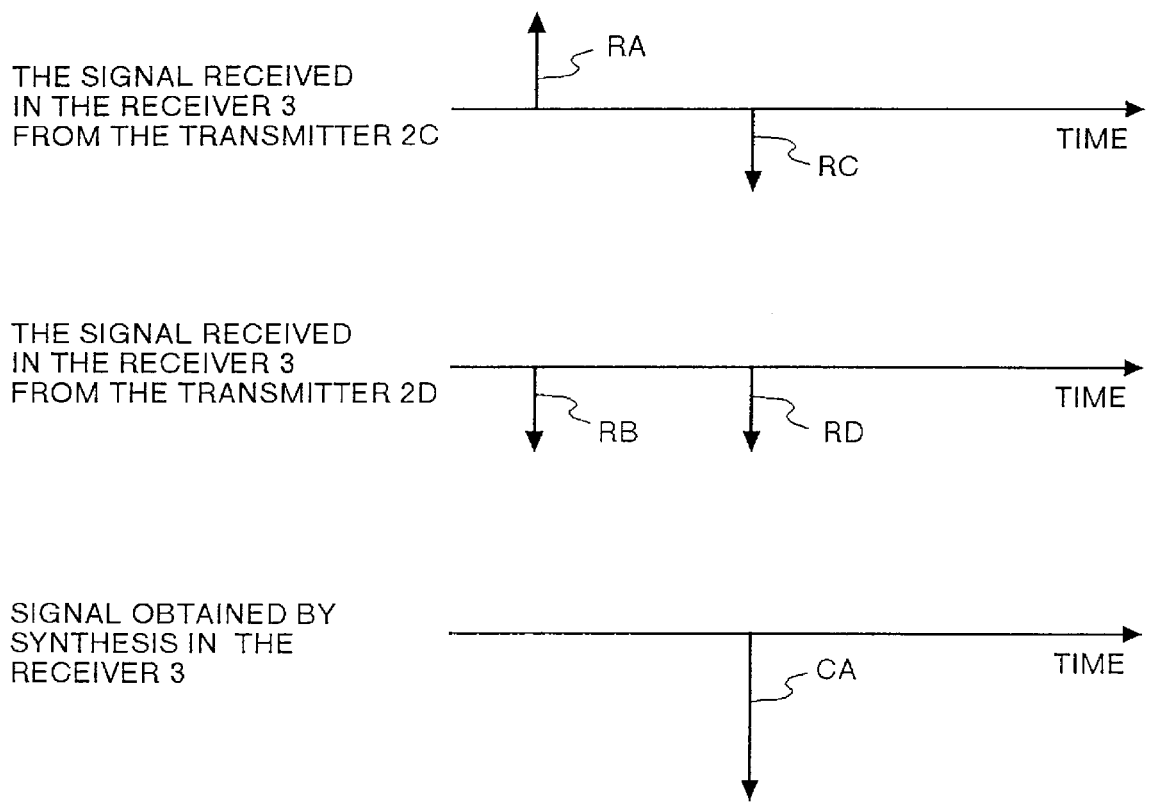
FIG. 7 is a timing chart showing the radio wave propagation in the radio communication system according to the second embodiment.

FIG. 7 is a timing chart showing the radio wave propagation in the radio communication system according to the present embodiment. The present embodiment will explain the case where after the synthesization sections 11A and 11B delay the normal modulated signals differently (hereinafter, one signal is not delayed), phase rotation and amplitude regulation are carried out in the complex weight section 23, and the weighted signals which undergo the complex weighting are synthesized with the original modulated signals by the synthesization circuit 24. Here, the delay of the delay unit 22 in the signal filtering section 11A is set to 1 symbol, and a value of phase rotation/amplitude regulation in the complex weight section 23 (hereinafter, referred to as a weighting factor) is set to −1 (180° phase rotation). Further, the delay of the delay unit 22 in the signal filtering section 11B is set to 1 symbol, and a weighting factor of the complex weight section 23 is set to 1 (without phase rotation). The setting the delay amount and weight factors in the respective signal filtering sections is not limited to the above setting, and at least one of them may be different between the transmitters.

In the above structure, the condition that the signal receiving environment becomes the most strict is the case where the receiver 3 is positioned in between the two transmitters. In the first embodiment, since the undelayed signal and the delayed signal are transmitted from different antennas, the phase relationship between these signals can attain any arbitrary value. However, in the present embodiment, since the filtered signals are transmitted from one antenna, the phase relationship between these signals is determined constantly by the complex weight section 23.

In this case, in the radio communication system according to the present embodiment, the signal component RC which is delayed in the transmitter 2C has a phase opposite to that of the signal component RA which is not delayed in the transmitter 2C, and the signal component RD which is delayed in the transmitter 2D always has the phase which is the same as that of the signal component RB which is not delayed in the transmitter 2D. For this reason, when the signal component RA and the signal component RB have opposite phases, the signal component RC and the signal component RD always have the same phases. As a result, the received signals do not offset each other completely so as to always remain. Precisely, in FIG. 7, the two signals of the signal component CA and the signal component CC are synthesized in the receiver.

In the present embodiment, at least one of the delay amount and weighting factors is set to a different value for adjacent transmitters so that the signal components do not offset each other. For this reason, the conventionally occurring phenomenon that the filtered signal decays in a specified area can be previously prevented. Moreover, in the present embodiment, even if the transmitters have respectively one antenna, the effect which is the same as that in the structure of the first embodiment having many antennas can be produced. Further, since the delay can be set to not more than 1 symbol, the circuit size of the equalizer in the receiver can be reduced greatly as compared to the conventional one.

Figure 8:
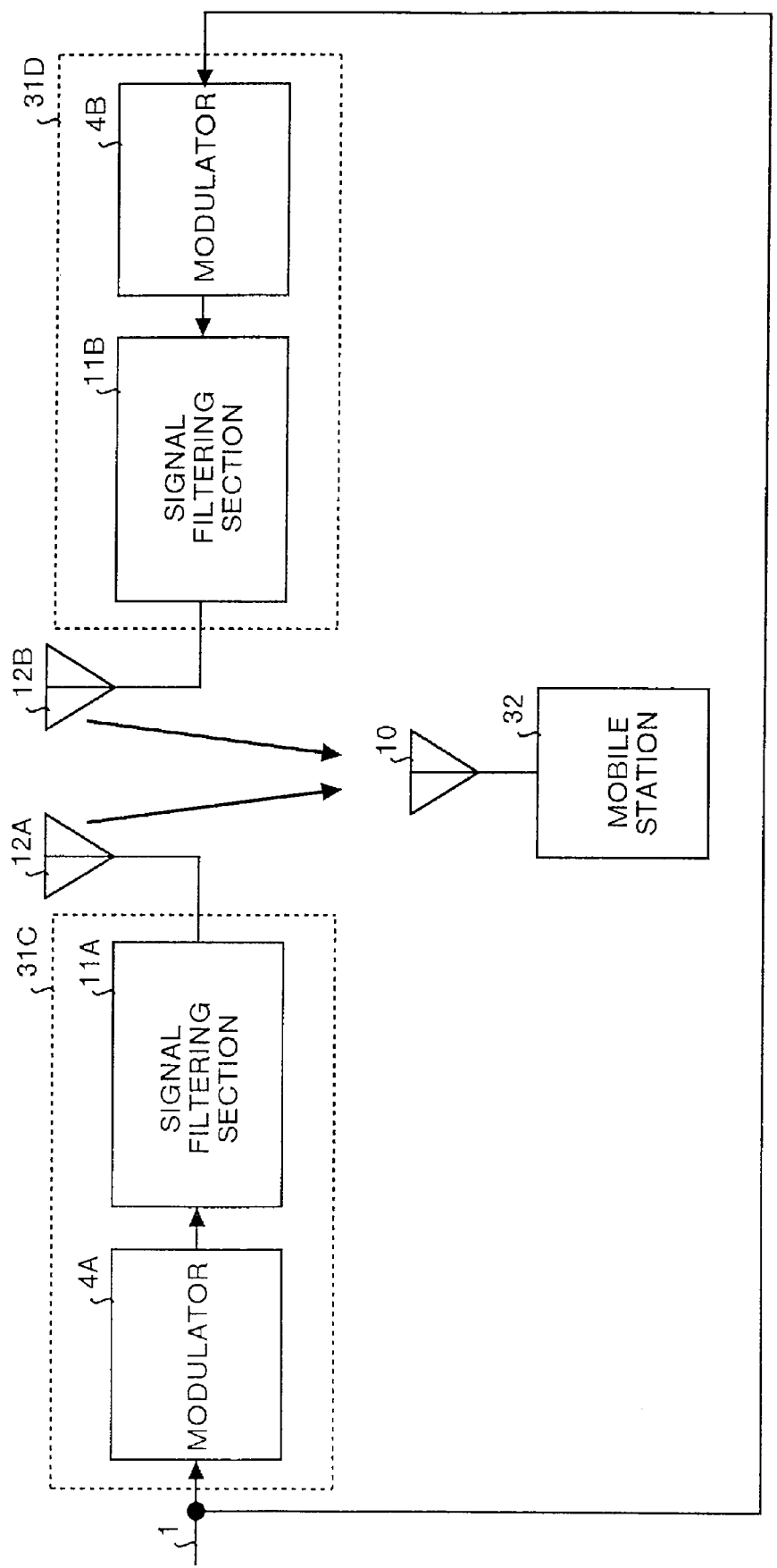
FIG. 8 is a diagram showing a concrete example in the case where the radio communication system of the present invention is applied to communication between the base station and the mobile station.

FIG. 8 is a diagram showing a concrete example in the case where the transmitters in the communication system shown in FIG. 5 are replaced by base stations (corresponding to base stations 31C and 32D in the drawing), and the receiver is replaced by a mobile station (corresponding to a mobile station 32), and the radio communication system of the present invention is applied to the communication between the base stations and the mobile station. Two base stations have been shown in FIG. 8 for convenience of explanation but the present invention is not limited to this. That is, three or more base stations may be used. Moreover, one antenna is shown in each of the base stations, but the present invention is not limited to this. That is, any number of antennas may be used.

Figure 9:
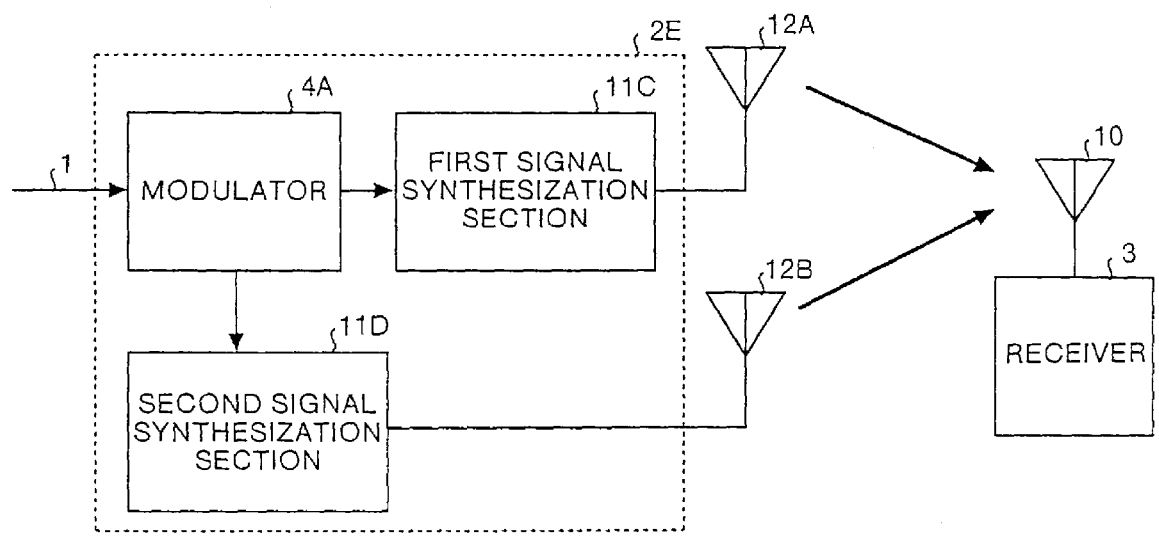
FIG. 9 is a diagram showing a structure of the radio communication system according to a third embodiment of the present invention.

FIG. 9 shows a structure of the radio communication system according to a third embodiment of the present invention. The same legends are provided to parts of the structure which are the same as those in the first and second embodiments, and the explanation thereof is omitted. In FIG. 9, legend 2E represents a transmitter, legend 11C represents a first signal filtering section, and legend 11D represents a second signal filtering section. The signal filtering sections in the present embodiment are the same as that shown in FIG. 6 according to the second embodiment.

The structure shown in FIG. 9 is only the ideal structure which fulfills all the important functions. For example, this function includes a case where an up-converting process for converting a base band signal into RF frequency has been performed at the time of outputting from the modulators 4A and 4B, a case where the process is performed after the delay process, or a case where the process is performed after gain regulation and all these cases. Moreover, the antennas include a leakage coaxial cable or the like which has the same function as a normal antenna.

A difference between the present embodiment and the second embodiment is that one antenna is provided to each of the two transmitters but the two signal filtering sections are provided to one transmitter so that the total number of the antennas is two. Therefore, in the present embodiment, at least one of the delay amount and weighting factors in the signal filtering sections corresponding to a plurality of antennas provided to one transmitter is set to different values for the adjacent antennas. As a result, the same effect as that of the second embodiment can be produced.

Figure 10:
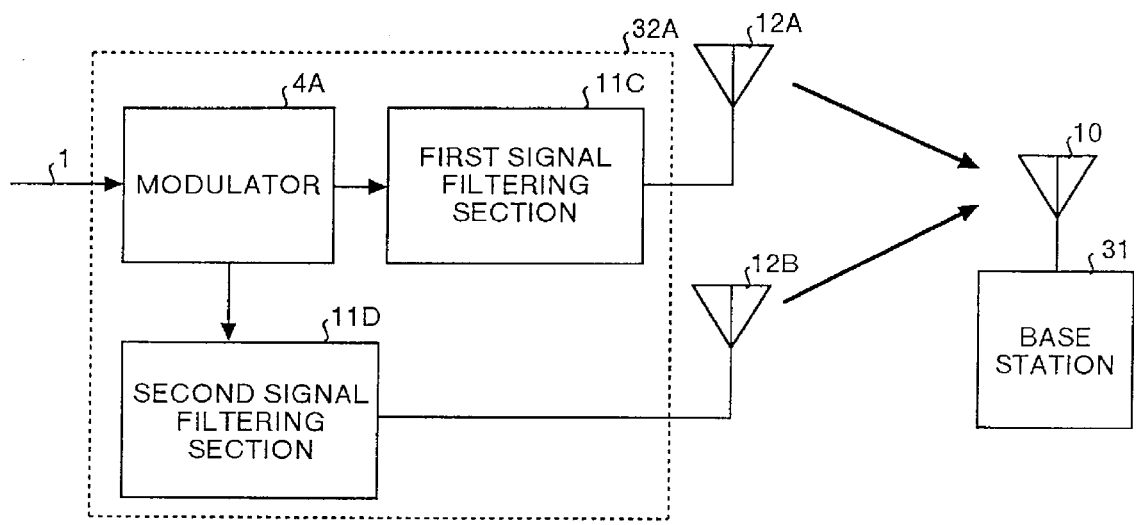
FIG. 10 is a diagram showing a concrete example in the case where the radio communication system of the present invention is applied to communication between the base station and the mobile station.
Figure 11:
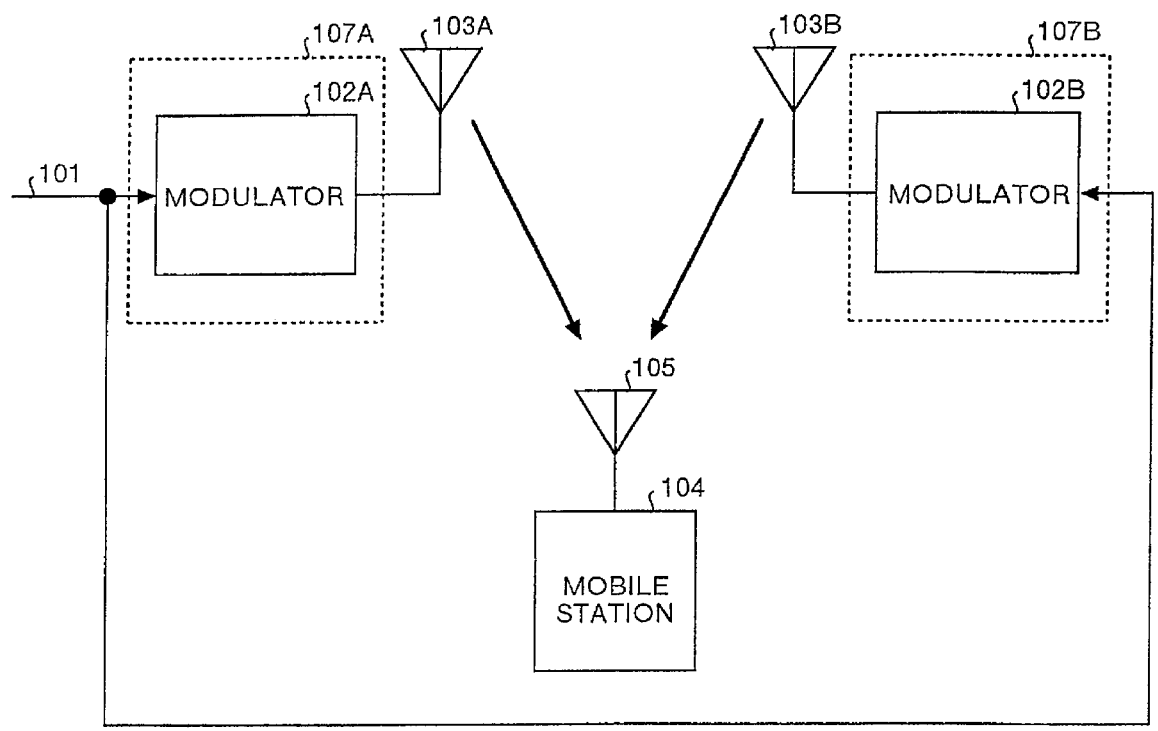
FIG. 11 is a diagram showing a structure of a conventional radio communication system.
Figure 12:
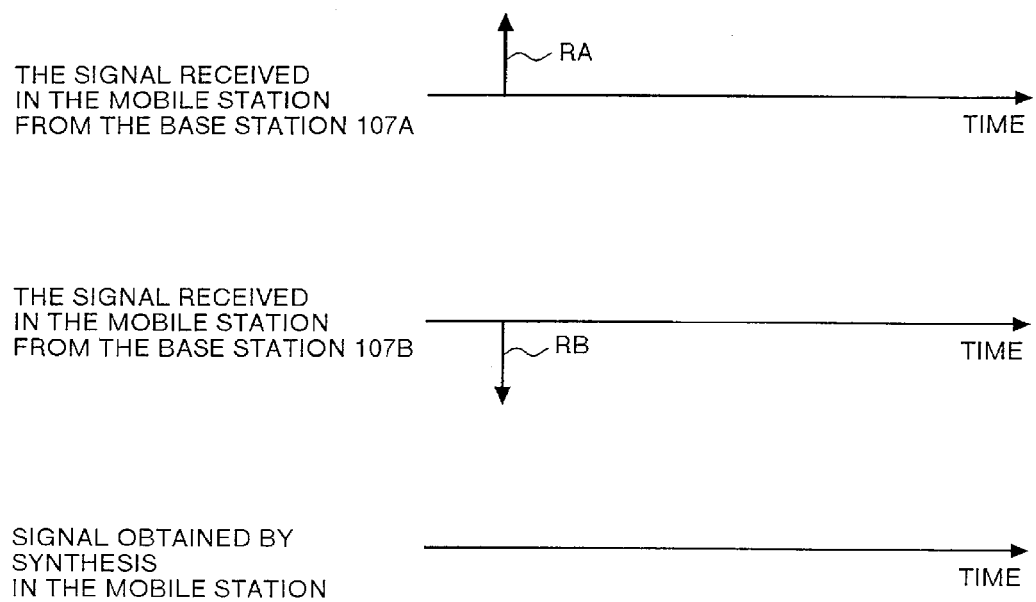
FIG. 12 is a timing chart showing radio wave propagation in the conventional radio communication system.
Figure 13:
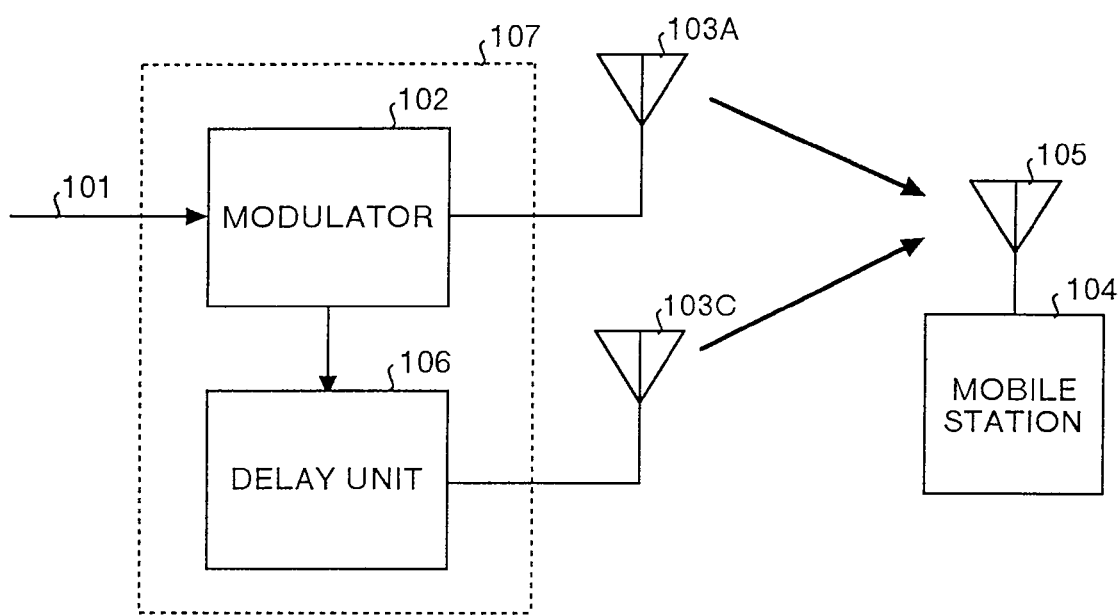
FIG. 13 is a diagram showing a structure of a radio communication system different from the one shown in FIG. 11.

FIG. 10 is a diagram showing a concrete example in the case where the transmitter in the communication system shown in FIG. 9 is replaced by a mobile unit (corresponding to a mobile unit 32A in the drawing), and the receiver is replaced by a base station (corresponding to a mobile station 31), and the radio communication system of the present invention is applied to the communication between the base station and the mobile station. However, in FIG. 9 and FIG. 10, two antennas are provided to each of the base stations, but the present invention is not limited to this. That is, any number of antennas may be used.

INDUSTRIAL APPLICABILITY

The radio communication system of the present invention is useful for radio communication systems including a mobile phone and a portable telephone. Particularly, this system is suitable to a radio communication system which should cover a wide area in an environment that reception of a signal is difficult such as a place where signals from a plurality of base stations offset each other.

The invention claimed is:

1. A radio communication system comprising:
a plurality of transmitters each having at least one antenna for transmitting identical signals with the same frequency band; and
a receiver for receiving said signals,
wherein said signals supplied to the antennas are obtained by differently delaying modulated signals and carrying out weighting synthesization on the delayed and modulated signals, and
wherein at least one of a delay amount and a weighting factor in each of said transmitters is set to a value different from the other transmitters.

2. The radio communication system according to claim 1, wherein said receiver comprises an equalizer for demodulating a signal transmitted from at least one antenna in each of said transmitters.

3. A radio communication system comprising:
a plurality of transmitters, each having a plurality of antennas for transmitting identical signals with the same frequency band; and
a receiver for receiving said signals,
wherein said signals supplied to said plurality of antennas are obtained by differently delaying modulated signals and carrying out amplitude regulation on the delayed and modulated signals, and
wherein at least one of a delay amount and a value of amplitude regulation is set to different values in each of said transmitters.

4. The radio communication system according to claim 3, wherein said receiver comprises an equalizer for demodulating signals transmitted from said plurality of antennas.

5. A transmitter characterized in that in the case where a plurality of transmitters transmit same signals with same frequency band, at least one antenna is provided, signals which are supplied to respective antennas are signals which are obtained by differently delaying modulated signals and carrying out weighting synthesization on the delayed and modulated signals, and at least one of a delay amount and a weighting factor is set to a value different from the other transmitters.

* * * * *